(12) United States Patent
Plank et al.

(10) Patent No.: US 12,429,594 B2
(45) Date of Patent: Sep. 30, 2025

(54) TIME-OF-FLIGHT SENSING USING CONTINUOUS WAVE AND CODED MODULATION MEASUREMENTS

(71) Applicant: Infineon Technologies AG, Neubiberg (DE)

(72) Inventors: Hannes Plank, Graz (AT); Armin Josef Schoenlieb, Seiersberg-Pirka (AT)

(73) Assignee: Infineon Technologies AG, Neubiberg (DE)

( * ) Notice: Subject to any disclaimer, the term of this patent is extended or adjusted under 35 U.S.C. 154(b) by 1143 days.

(21) Appl. No.: 17/198,873

(22) Filed: Mar. 11, 2021

(65) Prior Publication Data

US 2021/0286080 A1  Sep. 16, 2021

(30) Foreign Application Priority Data

Mar. 13, 2020  (EP) .................................... 20163144

(51) Int. Cl.
| | | |
|---|---|---|
| G01S 17/89 | (2020.01) | |
| G01S 7/48 | (2006.01) | |
| G01S 7/484 | (2006.01) | |
| G01S 7/4865 | (2020.01) | |
| G01S 17/42 | (2006.01) | |

(52) U.S. Cl.
CPC ............ G01S 17/89 (2013.01); G01S 7/4808 (2013.01); G01S 7/484 (2013.01); G01S 7/4865 (2013.01); G01S 17/42 (2013.01)

(58) Field of Classification Search
CPC ........ G01S 17/89; G01S 7/4865; G01S 17/42; G01S 7/4915; G01S 17/32; G01S 17/36; G01S 17/10
See application file for complete search history.

(56) References Cited

U.S. PATENT DOCUMENTS

| | | | | |
|---|---|---|---|---|
| 9,664,790 | B2 * | 5/2017 | Wilks | ...................... G01S 17/36 |
| 2009/0059201 | A1 * | 3/2009 | Willner | ................... G01S 17/58 |
| | | | | 356/5.01 |
| 2016/0047895 | A1 | 2/2016 | Dussan | |
| 2016/0124089 | A1 * | 5/2016 | Meinherz | .............. G01S 17/894 |
| | | | | 356/5.01 |
| 2018/0348368 | A1 | 12/2018 | Bronstein et al. | |
| 2019/0265358 | A1 | 8/2019 | Fersch | |
| 2020/0349728 | A1 * | 11/2020 | Bitan | ...................... G06T 7/521 |
| 2021/0199802 | A1 * | 7/2021 | Mautner | .................. G01S 17/26 |

FOREIGN PATENT DOCUMENTS

| | | |
|---|---|---|
| CN | 109863418 A | 6/2019 |
| EP | 3159711 A1 | 4/2017 |

* cited by examiner

Primary Examiner — Yuqing Xiao
Assistant Examiner — Jempson Noel
(74) Attorney, Agent, or Firm — Murphy, Bilak & Homiller, PLLC

(57) ABSTRACT

A method for time-of-flight sensing is provided. The method includes for at least one pixel position performing at least one continuous wave measurement to obtain at least one first measurement value for the pixel position. Further, the method includes performing at least one coded modulation measurement to obtain at least one second measurement value for the pixel position. The method additionally includes determining an estimate of a distance value of the pixel position based on the at least one first measurement value and the at least one second measurement value using a mapping function.

15 Claims, 5 Drawing Sheets

Stage 1

Stage 2

Stage 3

TIME-OF-FLIGHT SENSING USING CONTINUOUS WAVE AND CODED MODULATION MEASUREMENTS

TECHNICAL FIELD

The present disclosure relates to Time-of-Flight (ToF) sensing. In particular, examples relate to a method and an apparatus for ToF sensing.

BACKGROUND

In conventional four-phase Continuous Wave (CW) ToF sensing, distance ambiguities are a major concern. Further, stray light affects conventional CW ToF sensing. Conventional coded ToF sensing approaches using Coded Modulation (CM) allow the measurement range of the ToF sensor to be limited, to avoid distance ambiguities. However, these conventional approaches come along with a variety of disadvantages such as increased exposure time, motion blur, etc.

Hence, there is a demand for improved ToF sensing.

SUMMARY

This demand may be satisfied by the subject matter of the appended claims.

An example relates to a method for ToF sensing. For at least one pixel position, the example method comprises performing at least one CW measurement to obtain at least one first measurement value for the pixel position. Further, the method comprises performing at least one CM measurement to obtain at least one second measurement value for the pixel position. The method additionally comprises determining an estimate of a distance value of the pixel position based on the at least one first measurement value and the at least one second measurement value using a mapping function.

Another example relates to an apparatus for ToF sensing of a scene. The example apparatus comprises a ToF sensor comprising a plurality of pixels. The ToF sensor is for at least one pixel position configured to perform at least one CW measurement to obtain at least one first measurement value for the pixel position, and to perform at least one CM measurement to obtain at least one second measurement value for the pixel position. Additionally, the apparatus comprises a processing circuit configured to determine an estimate of a distance value of the pixel position based on the at least one first measurement value and the at least one second measurement value using a mapping function.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or," this is to be understood to disclose all possible combinations, i.e., only A, only B as well as A and B, if not explicitly or implicitly defined otherwise. An alternative wording for the same combinations is "at least one of A and B" or "A and/or B". The same applies, mutatis mutandis, for combinations of more than two elements.

The terminology used herein for the purpose of describing particular examples is not intended to be limiting for further examples. Whenever a singular form such as "a," "an," and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes," and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
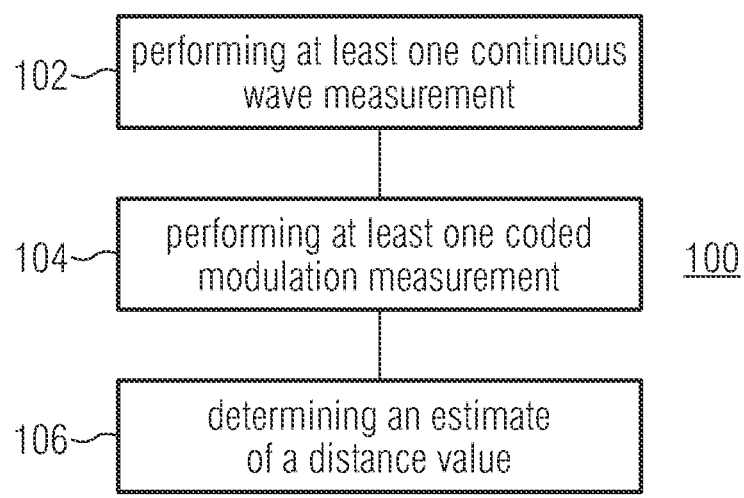
FIG. 1 illustrates a flowchart of an example of a method for ToF sensing.

FIG. 1 illustrates a flowchart of an example of a method 100 for ToF sensing of a scene. The method 100 will be described in the following for one of a plurality of pixels of a ToF sensor used for capturing the scene. The below described principles for this pixel position may equivalently be used for the other pixel positions of the ToF sensor.

The method 100 comprises performing 102 at least one continuous wave (CW) measurement to obtain at least one first measurement value for the pixel position. In CW measurements, the scene is illuminated by an illumination element of the ToF sensor based on an illumination signal exhibiting an alternating series of high and low pulses of equal duration (length). Similarly, a reference signal used for driving electronic circuitry in a light capturing element of the ToF sensor for measuring the reflected light at the pixel position exhibits an alternating series of high and low pulses of equal duration (length) in CW measurements. It is to be noted that the illumination signal and the reference signal used for a CW measurement may be identical, time-shifted (phase-shifted) with respect to each and/or be different from each other. For each CW measurement, at least one first measurement value for the pixel position is obtained.

The method 100 additionally comprises performing 104 at least one coded modulation (CM) measurement to obtain at least one second measurement value for the pixel position. In CM measurements, the scene is illuminated by the illumination element of the ToF sensor based on an illumination signal exhibiting an alternating series of high and low pulses of varying duration (length). Similarly, a reference signal used for driving the electronic circuitry in the ToF sensor for measuring the reflected light at the pixel position exhibits an alternating series of high and low pulses of varying duration (length). It is to be noted that the illumination signal and the reference signal used for a CM measurement may be identical, time-shifted (phase-shifted) with respect to each and/or be different from each other. For each CM measurement, at least one second measurement value for the pixel position is obtained.

In general, any number of CW measurements and any number of CM measurement may be performed. For example, exactly one (i.e., a single) CW measurement may be performed to obtain one first measurement value for the pixel position, and exactly one (i.e., a single) CM measurement may be performed to obtain one second measurement value for the pixel position. Alternatively, exactly two CW measurements may be performed to obtain two first measurement values for the pixel position, and exactly two CM measurements may be performed to obtain two second measurement values for the pixel position. However, also any other number of CW measurements and CM measurement may be used in other examples.

Further, the method 100 comprises determining 106 an estimate of (for) a distance value of the pixel position based on the at least one first measurement value and the at least one second measurement value using a mapping function. The estimate of the distance value indicates an approximation of a distance of an image plane as defined by the pixels of the ToF sensor to an object in the scene reflecting the light back to the pixel of the ToF sensor at the pixel position. The mapping function is a function that assigns one of a plurality of candidate (potential) estimates of the distance value to an input (argument) of the mapping function. The input (argument) of the mapping function is based on the at least one first measurement value and the at least one second measurement value. For example, the at least one first measurement value and the at least one second measurement value may be combined in order to determine the input (argument) of the mapping function.

The method 100 may allow to obtain the estimate of the distance value using both CW and CM measurements. Therefore, method 100 may allow to combine the advantages of CW measurements and CM measurements. Compared to conventional approaches (e.g., capturing eight CW ToF images), the combination of CW measurements and CM measurements may allow to reduce the number of ToF measurements and resolve distance ambiguities.

The method 100 may further comprise outputting the estimate of the distance value. Based on the estimate of the distance value, a final distance value may be determined. The distance value denotes the distance between an object in the scene and the image plane defined by the ToF sensor's light capturing element. Therefore, the method 100 may, e.g., further comprise determining the distance value by applying at least one error correction to the estimate of the distance value. For example, one or more error corrections for compensating errors in the signal path for supplying the reference signal to the pixel may be applied. Accordingly, fixed-pattern phase noise in the ToF sensor may be reduced (compensated). Alternatively or additionally, one or more error corrections for compensating temperature-dependent errors may be applied. For example, a correction factor derived from a temperate-dependent error correction function may be applied to the estimate of the distance value. Further alternatively or additionally, one or more error corrections for compensating the so-called wiggling error may be applied. The wiggling error describes the deviation of the actual behavior of the ToF from the underlying depth calculation model (e.g., as represented by the mapping function). Still further alternatively or additionally, one or more error corrections for compensating optical errors of the optics of the ToF sensor may be applied. For example, lens parameters may be calibrated if the distance value is to be used for a three-dimensional (3D) point cloud representation.

In some examples, the method 100 further comprises determining whether the distance value is likely to be in a target distance range. The target distance range denotes a desired distance range for the ToF measurement. In other words, the target distance range is the depth range in which distances to objects are to be determined. Determining whether the distance value is likely to be in a target distance range may be advantageous for various reasons. For example, the estimate of the distance value may only be determined if it is determined that the distance value is likely to be in the target distance range. That is, the determination of the estimate of the distance value may be omitted if the object represented by the estimate of the distance value is outside the interesting distance range. If it is determined that the distance value for the pixel position is likely to be outside of the target distance range, the method 100 may, e.g., comprise outputting an information indicating that an object in the scene at a position corresponding to the pixel position exhibits a distance not within the target distance range. This information may be used by other circuitry or applications for evaluating the scene.

FIG. 1 together with the above explanations highlighted the basics of the proposed technology for ToF sensing. In the following, further details of the method 100 will be described with reference to FIGS. 2 to 7.

Figure 2:
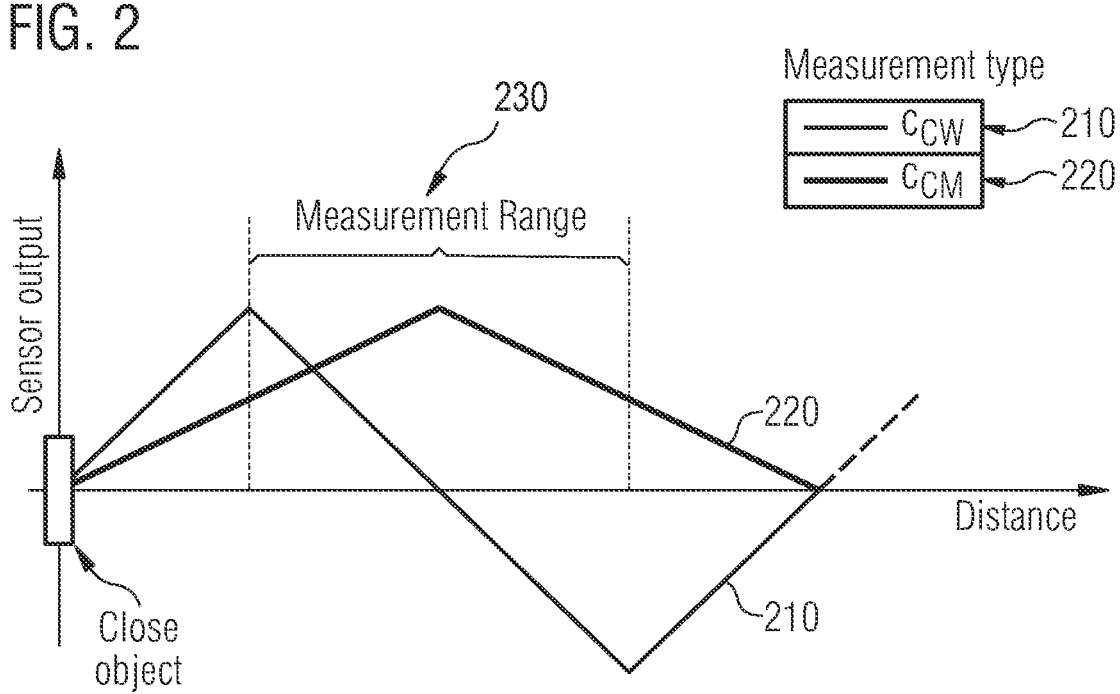
FIG. 2 illustrates exemplary correlation functions for performing one CW measurement and one CM measurement.

FIG. 2 illustrates exemplary correlation functions 210 and 220 for the case of performing one CW measurement and one CM measurement. The correlation function 210 illustrates the expected output of the ToF sensor for the CW measurement depending on the distance between the ToF sensor and the object in the scene reflecting the light of the ToF sensor. Similarly, the correlation function 220 illustrates the expected output of the ToF sensor for the CM measurement. A sample of the respective one of correlation function 210 and the correlation function 220 is, hence, obtained for each of the one CW measurement and the one CM measurement as measurement value for the respective measurement.

It is to be noted that the correlation functions 210 and 220 illustrated in FIG. 2 do not consider the decrease in signal strength with increasing distance. Further, it is to be noted that the exposure times used for the one CW measurement and the one CM measurement may be set to arbitrary values. No specific ratio between the exposure times used for the one CW measurement and the one CM measurement is required. In general, the exposure time used for the one CW measurement may be equal, shorter or longer than the exposure time used for the one CM measurement.

The output of the ToF sensor for the pixel position is related to the correlation between the illumination signal used by the illumination element for illuminating the scene and the reference signal used for driving the light capturing element. The correlation function $c_{CW}(ts)$ of the one CW measurement and the correlation function $c_{CM}(ts)$ of the one CM measurement both represent the value of the respective correlation at different time-shifts ts between the light (e.g., a light pulse) emitted by the illumination element based on the illumination signal for illuminating the scene and the reflected light (e.g., a light pulse) received by the light capturing element.

For example, the light capturing element may comprise a Photonic Mixer Device (PMD) for measuring the reflected light at the pixel position. The output of the PMD is the voltage difference between two capacitors A and B of the PMD and indicates a sample of the respective correlation function $c_{CW}(ts)$ or $c_{CM}(ts)$. The correlation functions $c_{CW}(ts)$ and $c_{CM}(ts)$ may, e.g., be defined within a normalized value range of [−1; 1]. However, it is to be noted that other value ranges may be used as well. In other examples, normalization may be omitted.

Assuming an ideal measurement without errors, the value of the respective correlation function may, e.g., be $c_{CW/CM}(ts)=-1$ if all charges are integrated into capacitor B. The value of the respective correlation function may, e.g., be $c_{CW/CM}(ts)=0$ if all charges are equally distributed between the capacitors A and B. Further, the value of the respective correlation function may, e.g., be $c_{CW/CM}(ts)=1$ if all charges are integrated into capacitor A.

Among other parameters, the time-shift ts is influenced by the time lag (time shift) between the illumination signal and the reference signal. Further, the time-shift ts is influenced by the distance d the light travels from the illumination element to the object in the scene and back to the pixel of the light capturing element. The distance d further also influences the light intensity I of the light received by the light capturing element (e.g., the light intensity/decreases for increasing distance d).

By adjusting the time lag between the illumination signal and the reference signal, the correlation functions $c_{CW}(ts)$ and $c_{CM}(ts)$ may be adjusted (shifted). For example, the time lag between the illumination signal and the reference signal may be adjusted by delaying one or both of the illumination signal and the reference signal. For example, a respective (e.g., adjustable) delay element may be used in the respective signal path of at least one of the illumination signal and the reference signal for adjusting the time lag between the illumination signal and the reference signal to a target (desired) value.

Shifting the correlation functions $c_{CW}(ts)$ and $c_{CM}(ts)$ by adjusting the time lag between the illumination signal and the reference signal may be advantageous for various reasons. For example, it may allow to reduce the sensitivity of the ToF sensor (e.g., to zero) at one or more target distances. This is illustrated in FIG. 2. In FIG. 2, a respective absolute value of the correlation functions 210 and 220 is substantially zero for a distance of substantially zero, as both correlation functions 210 and 220 exhibit a zero crossing at this distance. Since the absolute values of the correlation functions 210 and 220 are both substantially zero for this distance, the ToF sensing is not sensitive to reflections coming from objects located at this distance. Similarly, the sensitivity of the ToF sensing may be effectively reduced to zero if the respective absolute value of correlation functions 210 and 220 is small at this distance. The sensitivity of the ToF sensing may be effectively reduced to zero at any other desired distance by shifting the zero crossings of the correlation functions 210 and 220 to or near to the desired distance. In other words, the correlation functions 210 and 220 may be adjusted such that a respective absolute value of the correlation functions 210 and 220 is smaller than a threshold value (close to zero) for a predetermined (desired, target) distance.

The ToF sensor is usually covered by an element such as a cover glass or a translucent display (e.g., an Organic Light Emitting Diode, OLED, display). The light emitted by the ToF sensor is in part reflected by the element covering the ToF sensor and may, hence, cause erroneous measurements. By adjusting the correlation functions 210 and 220 such that a respective absolute value of the correlation functions 210 and 220 is smaller than a threshold value (close to zero) for the distance at which the element covering the ToF sensor is arranged, the erroneous measurements caused by the element covering the ToF sensor may be mitigated or even fully compensated as the ToF sensing is effectively not sensitive to reflections coming from this distance.

In the example of FIG. 2, the correlation functions $c_{CW}(ts+tl_1)$ is generated by CW modulation with an exposure time $E_{CW}$. The correlation functions $c_{CM}(ts+tl_2)$ is generated by CM with an exposure time $E_{CM}$. In the ToF images captured for the respective measurements, each pixel comprises a respective sample $C_{CW}$ or $C_{CM}$ of these correlation functions at the time shift ts. The relative time lag $tl_1-tl_2$ between the correlation functions is chosen such that ratio of correlation functions is strictly monotonic decreasing or strictly monotonic increasing in the target distance range 230. If it is desired (or required) to remove the influence of close objects such as a cover glass, the time shifts ts is selected such that that zero crossings of the CW and the CM correlation function are located at the distance (position) of the close object.

Further illustrated in FIG. 2 is the relation of the target distance range (measurement range) 230 to the correlation functions 210 and 220. The ratio of correlation functions 210 and 220 of the one CW measurement and the one CM measurement is strictly monotonic decreasing in the target distance range 230. In other words, the target distance range is the distance range in which the ratio of correlation functions 210 and 220 of the one CW measurement and the one CM measurement is strictly monotonic decreasing. In alternative examples, the target distance range may be the distance range in which the ratio of correlation functions 210 and 220 of the one CW measurement and the one CM measurement is strictly monotonic increasing.

Figure 3:
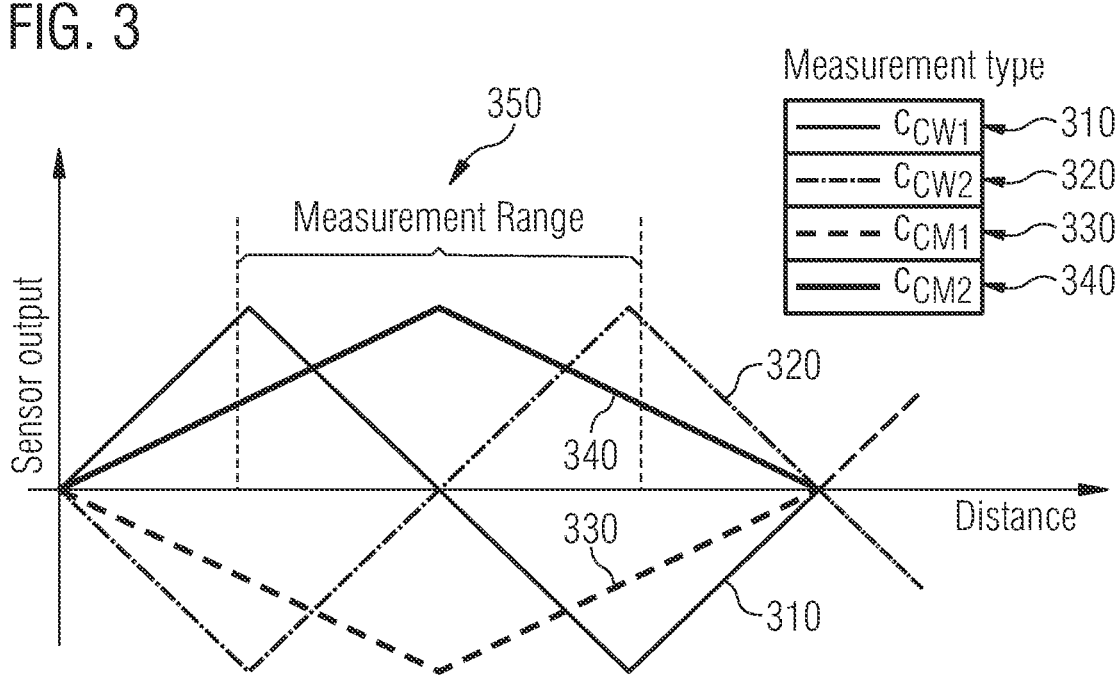
FIG. 3 illustrates exemplary correlation functions for performing two CW measurement and two CM measurement.

In some examples, one additional CW measurement and one additional CM measurement may be taken. In other words, two CW measurements may be performed to obtain two first measurement values for the pixel position, and two CM measurements may be performed to obtain two second measurement values for the pixel position. FIG. 3 illustrates exemplary correlation functions 310, 320, 330 and 340 for the case of performing two CW measurement and two CM measurement.

As can be seen from FIG. 3, the correlation functions 310 and 320 of the two CW measurements are phase-shifted by 180° with respect to each other. Similarly, the correlation functions 330 and 340 of the two CM measurements are phase-shifted by 180° with respect to each other. The correlation functions 310 and 320 of the two CW measurements are axially symmetric, and also the correlation functions 330 and 340 of the two CM measurements are axially symmetric. In other words, the correlation functions of the additional measurements are inverted to their counterparts. Using two CW measurements and two CM measurements may allow to mitigate (compensate or eliminate) certain errors. For example, depending on the implementation of the circuitry in the pixel of the light-receiving element, background light from the scene may cause an offset in the measurement that may be compensated if the two CW measurements and two CM measurements are taken.

Again, the ratio of each of the correlation functions 310 and 320 of the two CW measurement to each of the correlation functions 330 and 340 of the two CM measurements is either strictly monotonic decreasing or strictly monotonic increasing in the target distance range 350.

The position of the zero crossings of the correlation functions 310, 320, 330 and 340 may be adjusted similarly to what is described above for FIG. 2.

In the following, further details about how the estimate for the distance is determined will be described.

The at least one first measurement value $C_{CW}$ for the at least one CW measurement is proportional to the amount of light received at the pixel position which depends on the light intensity I and the exposure time $E_{CW}$ for the at least one CW measurement: Assuming that the light is reflected from a single object in the scene, the at least one first measurement value $C_{CW}$ may be expressed as follows:

$$C_{CW} = c_{CW}(ts) \cdot E_{CW} \cdot I. \quad (1)$$

Similarly, the at least one second measurement value $C_{CM}$ for the at least one CM measurement is proportional to the amount of light received at the pixel position which depends on the light intensity I and the exposure time $E_{CM}$ for the at least one CM measurement: Assuming that the light is reflected from a single object in the scene, the at least one second measurement value $C_{CM}$ may be expressed as follows:

$$C_{CM} = c_{CM}(ts) \cdot E_{CM} \cdot I. \quad (2)$$

For determining the estimate of the distance value of the pixel position, the at least one first measurement value $C_{CW}$ and the at least one second measurement value $C_{CM}$ are set in relation. In particular, the method 100 may further comprise determining a ratio value (ToF ratio) Q based on a ratio of a first value $C_1$ related to the at least one first measurement value $C_{CW}$ to a second value $C_2$ related to the at least one second measurement value $C_{CM}$:

$$Q \sim \frac{C_1}{C_2}. \quad (3)$$

The first value $C_1$ is based on the at least one first measurement value $C_{CW}$, whereas the second value $C_2$ is based on the at least one second measurement value $C_{CM}$. For example, if exactly one CW measurement and one CM measurement are performed, the first value $C_1$ may be the one first measurement value $C_{CW}$ obtained for the one CW measurement, and the second value $C_2$ may be the one second measurement value $C_{CM}$ obtained for the one CM measurement. In other words, $C_1 = C_{CW}$ and $C_2 = C_{CM}$ if exactly one CW measurement and one CM measurement are performed. If two CW measurements and two CM measurements are performed, the first value $C_1$ may correspond to the difference between the two first measurement values $C_{CW1}$ and $C_{CW2}$ obtained for the two CW measurements, and the second value $C_2$ may correspond to the difference between the two second measurement values $C_{CM1}$ and $C_{CM2}$ obtained for the two CM measurements. In other words, $C_1 = C_{CW1} - C_{CW2}$ and $C_2 = C_{CM1} - C_{CM2}$ if two CW measurements and two CM measurements are performed.

The ratio value Q may, e.g., be determined taking into account the exposure times for the at least one CW measurement and the at least one CM measurement in order to compensate for different exposure times. For example, the ratio value Q may expressed as follows:

$$Q = \frac{C_1 \cdot E_{CM}}{C_2 \cdot E_{CW}}. \quad (4)$$

In other words, the ratio value Q is determined in mathematical expression (4) further based on a ratio of the exposure time $E_{CM}$ used for the at least one CM measurement to the exposure time $E_{CW}$ used for the at least one CW measurement. The ratio value Q according to mathematical expression (4) is independent of the received light intensity I and the used exposure times. In general, the ratio function (ToF ratio function)

$$q(ts) = \frac{C_1(ts_1) \cdot E_{CM}}{C_2(ts_2) \cdot E_{CW}} = \frac{c_{CW}(ts_1) \cdot E_{CW} \cdot E_{CM} \cdot I}{c_{CM}(ts_2) \cdot E_{CM} \cdot E_{CW} \cdot I} = \frac{c_{CW}(ts_1)}{c_{CM}(ts_2)} \quad (5)$$

describing the ratio value Q for different time shifts ts (corresponding to different distances d) is independent of the received light intensity I and the used exposure times. It is to be noted that mathematical expression (5) refers to the case that exactly one CW measurement and one CM measurement are performed. An equivalent expression may be derived for the case that two CW measurements and two CM measurements are performed.

The estimate $\tilde{d}$ for the distance value of the pixel position is determined based on the ratio value Q using the mapping function m(Q). This may be expressed as follows:

$$\tilde{d} = m(Q). \quad (6)$$

The mapping function m(Q) assigns one of a plurality of candidate estimates of the distance value to the argument of the mapping function, i.e., the determined ratio value Q. In other words, the mapping function m(Q) translates (converts) the ToF ratio Q to a value $\tilde{d}$ which is linear dependent (e.g., proportional with offset) to the actual distance d. As described above, the distance value d may be determined based on the estimate $\tilde{d}$ by applying one or more error corrections to the estimate $\tilde{d}$ of the distance value.

The mapping function m(Q) may be determined in different ways. For example, the mapping function m(Q) may be determined (e.g., calculated) by assuming various characteristics (properties) of the ToF sensor such as the shape of light-pulses, pixel characteristics, optics characteristics, etc., Systematic errors introduced with this approach may be mitigated (compensated) subsequently by applying one or more corresponding error corrections to the estimate $\tilde{d}$ of the distance value.

Alternatively, the mapping function m(Q) may be determined based on CW calibration measurements. For example, a reference object may be arranged at a reference distance in the scene during the CW calibration measurements. Different time lags (time-shifts) between the CW illumination signal used for illuminating the scene and the reference signal used for capturing reflected light from the scene are used for the CW calibration measurements. Accordingly, a discrete number of samples for the ratio function q(ts) may be collected. The samples may be normalized and associated with their respective ground-truth distance. The respective ground-truth distance may be determined (calculated) based on the adjusted time lags and the reference distance. These samples serve as the basis for establishing the mapping function mapping function m(Q). For example, the samples may be arranged on the x-axis, wherein the associated ground-truth distance may be put on the y-axis. By interpolating these values, the mapping function m(Q) may be obtained. The samples may, e.g., be interpolated during ToF sensing or beforehand and be stored in a lookup table. Optionally, multiple measurements may be performed and averaged for each time lag in order to remove noise. If the mapping function m(Q) is derived specifically (individually) for the ToF sensor, all or at least most systematic errors which are common to the pixels of the ToF sensor may be corrected. Accordingly, error correction for wiggling errors may be omitted.

As described above, the method 100 may further comprise determining whether the distance value is likely to be in the target distance range. In the following, three examples for how to determine whether the distance value is likely to be in the target distance range will described with reference to FIGS. 4 to 6.

Figure 4:
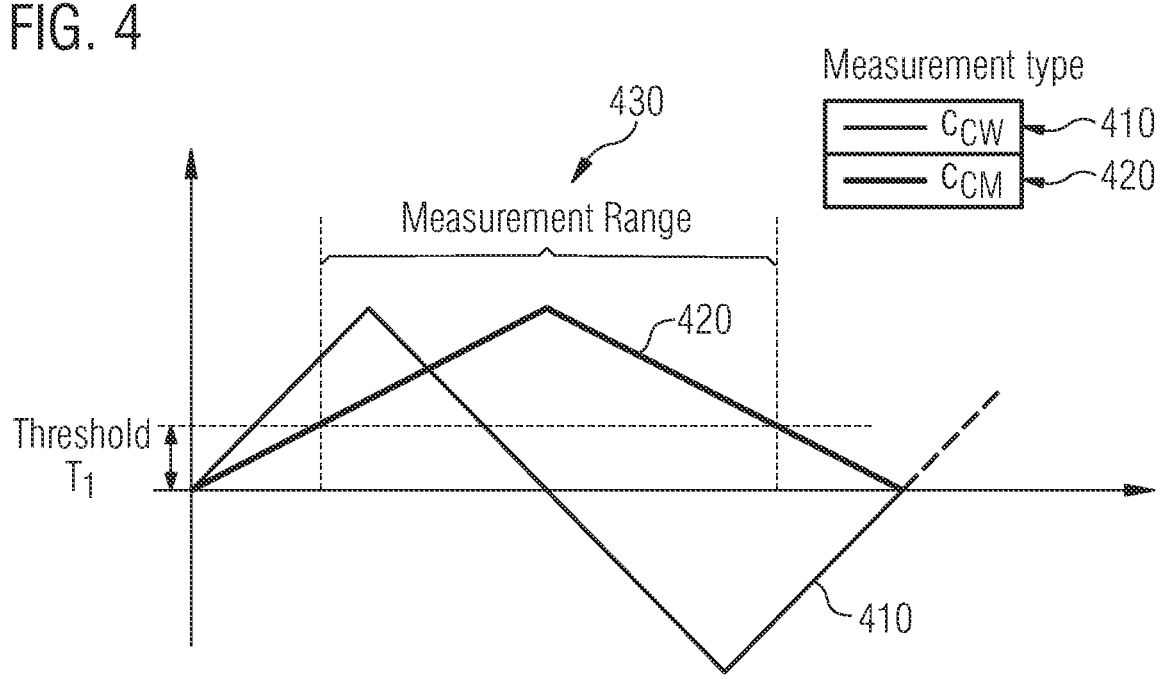
FIG. 4 illustrates a first example for determining whether the distance value is likely to be in the target distance range.

In the example of FIG. 4, the second value $C_2$ for the at least one CM measurement is compared to a single threshold value $T_1$ for determining whether the distance value d is likely to be in the target distance range. If the second value $C_2$ satisfies a predetermined condition with respect to the threshold value $T_1$, it is determined that the distance value for the pixel position is likely to be in the target distance range.

In order to simplify the explanation, it is assumed in the example of FIG. 4 that exactly one CW measurement and one CM measurement are performed. The determination whether the distance value d is likely to be in the target distance range may be performed analogously for the case that two CW measurements and two CM measurements are performed.

FIG. 4 illustrates the correlation functions 410 and 420 of the CW measurement and the CM measurement. As described above, the second value $C_2$ for the one CM measurement is the second measurement value $C_{CM}$, i.e., a sample of the correlation function 420. In other words, the correlation function 420 represents possible values of the second value $C_2$. If the correlation function 420 is above the threshold value $T_1$, the distance value d is in the target distance range 430. In other words, the predetermined condition with respect to the threshold value $T_1$ is that the second value $C_2$ is above the threshold value $T_1$. As can be from FIG. 4, by adjusting the threshold level, the target distance range (measurement range) 430 may be adjusted. Depending on the structure of the correlation functions 410 and 420, the predetermined condition with respect to the threshold value $T_1$ may in other examples be that the second value $C_2$ is below the threshold value $T_1$.

The CM measurement (i.e., the value of the correlation function 420) depends on the amount of received light.

Accordingly, the target distance range might vary based on the reflectivity of the object in the scene and the distance to the object. This may be compensated by scaling (at least) one of the threshold value $T_1$ and the second value $C_2$ based on a scaling value prior to comparing it to the other one of the threshold value $T_1$ and the second value $C_2$. The scaling value is determined based on an estimate of the intensity of light received during the at least one CW measurement or the at least one CM measurement. For example, the estimate of the intensity of light may be a greyscale value in a greyscale image captured in addition to the at least one CW measurement and the at least one CM measurement. In other examples, the estimate of the intensity of light may be a total amount of charges obtained by the light-capturing element at the pixel position for the at least one CW measurement or the at least one CM measurement (e.g., the summed charges in buckets A and B of the PMD at the pixel position for the CW measurement). Accordingly, the thresholding is independent of the amount of received light.

Figure 5:
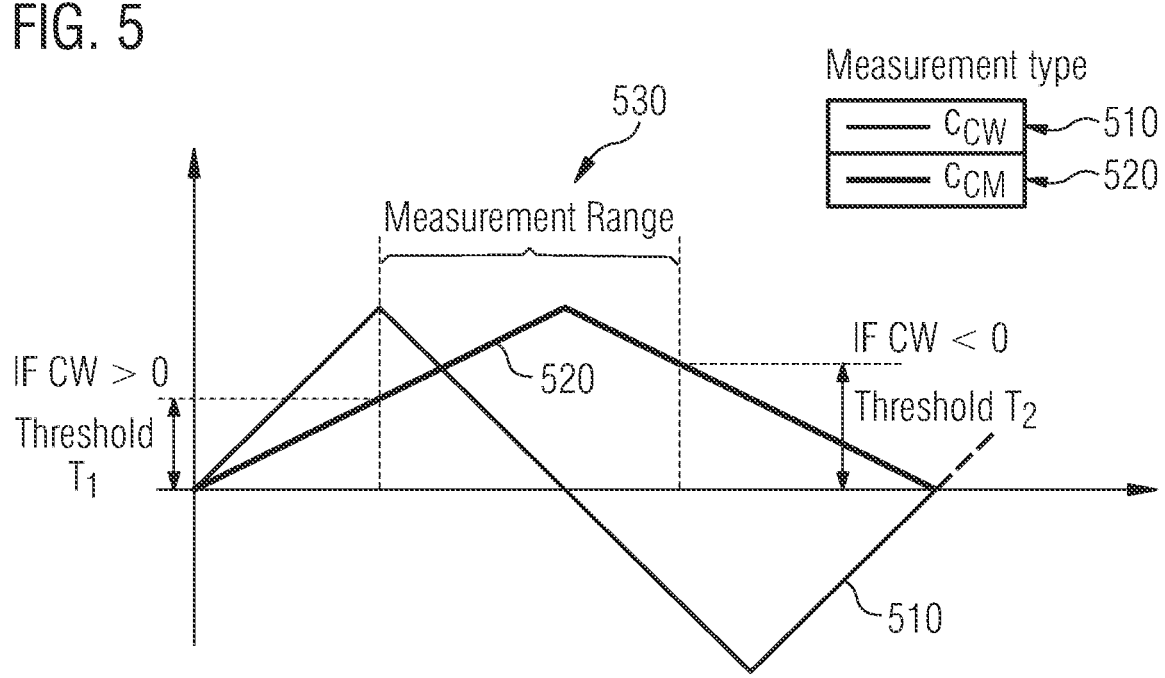
FIG. 5 illustrates a second example for determining whether the distance value is likely to be in the target distance range.

An alternative method using two threshold values $T_1$ and $T_2$ for determining whether the distance value is likely to be in the target distance range is illustrated in FIG. 5. In order to simplify the explanation, it is again assumed that exactly one CW measurement and one CM measurement are performed in the example of FIG. 5. The determination whether the distance value d is likely to be in the target distance range may be performed analogously for the case that two CW measurements and two CM measurements are performed.

FIG. 5 illustrates the correlation functions 510 and 520 of the CW measurement and the CM measurement. As described above, the second value $C_2$ for the one CM measurement is the second measurement value $C_{CM}$, i.e., a sample of the correlation function 520. In other words, the correlation function 520 represents possible values of the second value $C_2$. Similarly, the first value $C_1$ for the one CW measurement is the first measurement value $C_{CW}$, i.e., a sample of the correlation function 510. In other words, the correlation function 510 represents possible values of the first value $C_1$.

First, it is determined whether the first value $C_1$ (which is sample of the correlation function 510) is within a first value range defined for a beginning of the target distance range (measurement range) 530 or within a second value range defined for an end of the target distance range 530. In the example of FIG. 5, it is determined whether the first value $C_1$ is a positive value (i.e., first value range: all values <0) or a negative value (i.e., second value range: all values >0). As can be seen from FIG. 5, the correlation function 510 is positive at the beginning of the target distance range 530 and negative at the end of the target distance range 530. Therefore, determining whether the first value $C_1$ is positive or negative allows to determine whether the measured object is closer to the beginning or the end of the target distance range. Depending on the structure of the correlation functions 510 and 520, the first value range and the second value range may be different from what is described above for FIG. 5.

If the first value $C_1$ is within the first value range (i.e., positive, such that the object is closer to the beginning of the target distance range 530), the second value $C_2$ (which is sample of the correlation function 520) is compared to the first threshold value $T_1$ defined for the target distance range. In the example of FIG. 5, the first threshold value $T_1$ defines the beginning of the target distance range. If the second value $C_2$ satisfies a predetermined condition with respect to the first threshold value $T_1$, it is determined that the distance value d for the pixel position is likely to be in the target distance range 530. In the example of FIG. 5, it is determined that the distance value d is in the target distance range 530 if the second value $C_2$ is above the first threshold value $T_1$. In other words, the predetermined condition with respect to the first threshold value $T_1$ is that the second value $C_2$ is above the first threshold value $T_1$. The above condition allows to determine whether the distance value d for the pixel position is likely behind the start of the measurement range 530. As can be from FIG. 5, by adjusting the first threshold value $T_1$, the beginning of the target distance range 530 may be adjusted.

If the first value $C_1$ is within the second value range (i.e., negative, such that the object is closer to the end of the target distance range 530), the second value $C_2$ (which is sample of the correlation function 510) is compared to the second threshold value $T_2$ defined for the target distance range. In the example of FIG. 5, the second threshold value $T_2$ defines the end of the target distance range. If the second value $C_2$ satisfies a predetermined condition with respect to the second threshold value $T_2$, it is determined that the distance value d for the pixel position is likely to be in the target distance range 530. In the example of FIG. 5, it is determined that the distance value d is in the target distance range 530 if the second value $C_2$ is above the second threshold value $T_2$. In other words, the predetermined condition with respect to the second threshold value $T_2$ is that the second value $C_2$ is above the second threshold value $T_2$. The above condition allows to determine whether the distance value d for the pixel position is likely in front of the end of the measurement range 530. As can be from FIG. 5, by increasing the second threshold value $T_2$, the end of the target distance range 530 may be restricted.

Depending on the structure of the correlation functions 510 and 520, the predetermined conditions with respect to the first threshold value $T_1$ and the second threshold value $T_2$ may be different from what is described above for FIG. 5. For example, the predetermined conditions with respect to the first threshold value $T_1$ and the second threshold value $T_2$ may be that the second value $C_2$ is below the respective threshold value.

The method illustrated in FIG. 5 may allow to arbitrarily restrict the start and the stop of the target distance range 530 by adjusting the thresholds $T_1$ and $T_2$ for the second value $C_2$ of the at least one CM measurement and by checking if the first value $C_1$ of the at least one CW measurement meets certain conditions. If the values $C_1$ and $C_2$ met the conditions, the measurement is within the range and valid such that the depth (distance) and other quantities such as the light intensity may be determined subsequently.

Similar to what is described above for FIG. 4, scaling may be used to compensate for the amount of received light. For example, (at least) one of the second value $C_2$ and the one of the first threshold value $T_1$ and the second threshold value $T_2$ may be scaled based on a scaling value prior to comparing it to the other one of the second value $C_2$ and the one of the first threshold value $T_1$ and the second threshold value $T_2$. As described above, the scaling value may be based on an estimate of the intensity of light received during the at least one CW measurement or the at least one CM measurement.

Figure 6A:
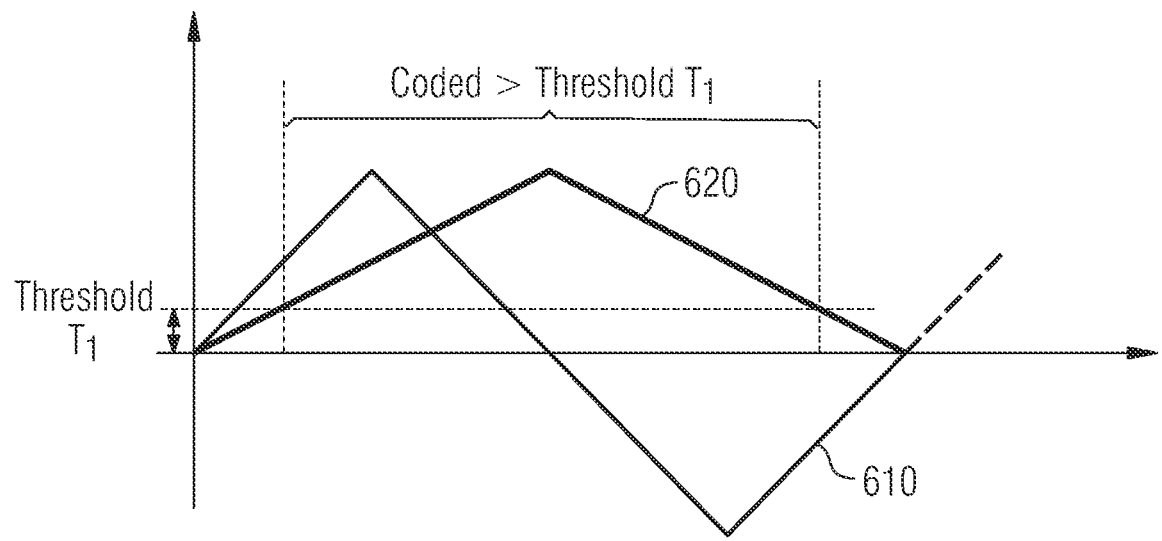
FIGS. 6a to 6c illustrate a third example for determining whether the distance value is likely to be in the target distance range.
Figure 6B:
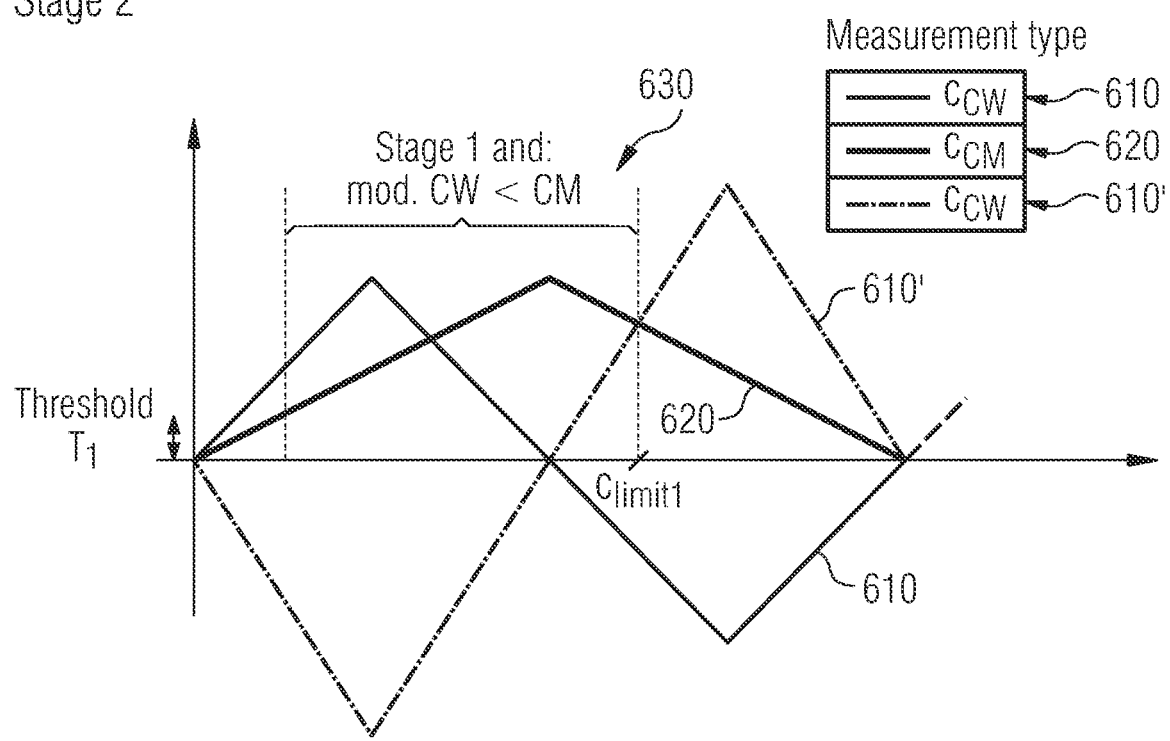
Figure 6C:
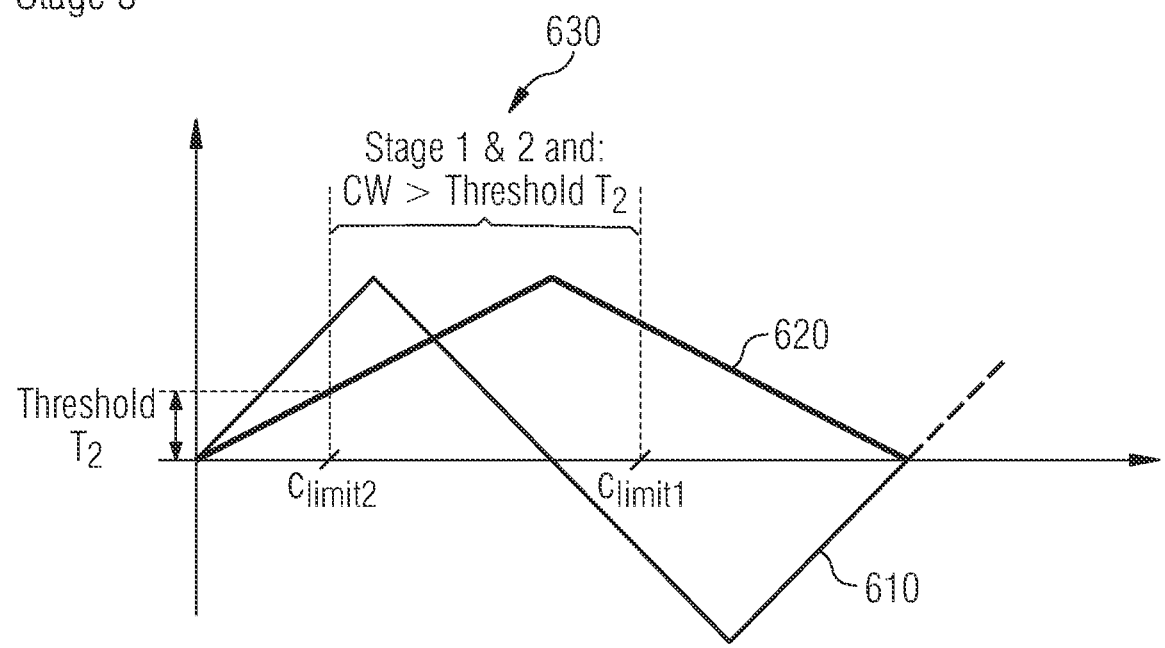

Another alternative for determining whether the distance value is likely to be in the target distance range is illustrated in FIGS. 6a to 6c. The method illustrated in FIGS. 6a to 6c uses three stages each of which is illustrated in one of FIGS. 6a to 6c. The three stages allow the discrimination of a pixel if its related distance value is out-of-range. Due to the three-stage approach, the limits of the target distance range are not influenced by the amount of received light.

In order to simplify the explanation, it is again assumed that exactly one CW measurement and one CM measurement are performed in the example of FIGS. 6a to 6c. The determination whether the distance value d is likely to be in the target distance range may be performed analogously for the case that two CW measurements and two CM measurements are performed.

FIGS. 6a to 6c illustrate the correlation functions 610 and 620 of the CW measurement and the CM measurement. As described above, the second value $C_2$ for the one CM measurement is the second measurement value $C_{CM}$, i.e., a sample of the correlation function 620. In other words, the correlation function 620 represents possible values of the second value $C_2$. Similarly, the first value $C_1$ for the one CW measurement is the first measurement value $C_{CW}$, i.e., a sample of the correlation function 610. In other words, the correlation function 610 represents possible values of the first value $C_1$.

In the first stage illustrated in FIG. 6a, the second value $C_2$ is compared to a first threshold value $T_1$ defined for the target distance range. If the second value $C_2$ satisfies a predetermined condition with respect to the first threshold value $T_1$, the second stage is performed. In the example of FIG. 6a, it is determined whether the second value $C_2$ is above the first threshold value $T_1$. In other words, the predetermined condition with respect to the first threshold value $T_1$ is that the second value $C_2$ is above the first threshold value $T_1$. The above condition allows the removal of all pixels far from the target distance range. As can be from FIG. 6a, by varying the first threshold value $T_1$, the strictness of the filtering may be adjusted.

In the second stage illustrated in FIG. 6b, the first value $C_1$ is scaled based on a scaling value to obtain a scaled first value $C'_1$. The scaling value is the ratio of the value of the correlation function 620 for a target distance $c_{limit1}$ to the value of the correlation function 610 for the target distance 631. The target distance $c_{limit1}$ limits the target distance range 630. The target distance $c_{limit1}$ may be the end of the target distance range 630 as illustrated in FIG. 6b. The scaling value may be a positive or negative value. In the example of FIG. 6, the scaling value is a negative value. All possible scaled first values $C'_1$ are represented by the scaled correlation function 610' obtained by scaling the correlation function 610 with the scaling value. Due to the scaling value, the scaled correlation function 610' exhibits the same value as the correlation function 620 for the distance $c_{limit}$. In other words, the scaling value is chosen such that the correlation function 620 for the CM measurement intersects the scaled correlation function 610' for the CW measurement for a certain (selected) distance. The intersection is independent of the amount of received light.

The scaled first value $C'_1$ is compared to the second value $C_2$. If the scaled first value $C'_1$ satisfies a predetermined condition with respect to the second value $C_2$, the third stage is performed. In the example of FIG. 6b, it is determined (checked) whether the scaled first value $C'_1$ is smaller than the second value $C_2$. In other words, the predetermined condition with respect to the second value $C_2$ is that the scaled first value $C'_1$ is smaller than the second value $C_2$. As can be seen from FIG. 6b, the second value $C_2$ as represented by the correlation function 620 is out of the target distance range limited by the distance $c_{limit1}$, if the second value $C_2$ is smaller than the scaled correlation function 610' representing the possible scaled first values $C'_1$. The second stage allows to remove all pixels for which the distance d is larger than the distance $c_{limit1}$ limiting the target distance range. In other words, pixels for which the distance d is out of the target distance range may be removed in the second stage.

In the third stage illustrated in FIG. 6c, the first value $C_1$ is compared to a second threshold value $T_2$ defined for the target distance range 630. If the first value $C_1$ satisfies a predetermined condition with respect to the second threshold value $T_2$, it is determined that that the distance value d for the pixel position is likely to be in the target distance range 630.

In the example of FIG. 6c, it is determined whether the first value $C_1$ is above the second threshold value $T_2$. In other words, the predetermined condition with respect to the second threshold value $T_2$ is that the first value $C_1$ is above the second threshold value $T_2$. As can be from FIG. 6c, by varying the second threshold value $T_2$, the other target distance $c_{limit2}$ which is the beginning of the target distance range 630 may be adjusted. In other words, the third stage allows a determination of whether an object in the scene reflecting the light back to the ToF sensor is closer to the ToF sensor than the beginning of the target distance range 630 (indicated by the distance $c_{limit2}$).

The three-stage approach described above in connection with FIGS. 6a to 6c allows a determination of whether an object in the scene reflecting the light back to the ToF sensor is within the target distance range independent of the amount of received light.

Depending on the structure of the correlation functions 610 and 620, the predetermined conditions may be different from what is described above in connection with FIGS. 6a to 6c.

According to some examples, the ratio value Q and the estimate $\tilde{d}$ for the distance value of the pixel position may only be determined if it is determined according to one of the above examples that the distance value d is likely to be in the target distance range.

Using CW and CM measurements according to the proposed technique may further be advantageous in terms exposure times for the ToF measurements. A ToF sensor has limited capacity in each pixel to accumulate charges (e.g., by charging an empty capacitor or by discharging a pre-charged capacitor). A too long exposure time may result in saturation of pixels. Due to the combination of CW and CM measurements, the exposure times for the at least one CM measurement may be increased compared to the exposure time used for the at least one CW measurement without the risk of saturation. This may be achieved by making the maximum output values of the ToF sensor, i.e., the maximum measurement values, identical for the CW and CM measurements within the target distance range (measurement range). Accordingly, an exposure time may be used for the at least one CM measurement that is not feasible for the at least one CW measurement. If a CW measurement had the same sensor output as the CM measurement at a certain distance, the CW measurement will saturate if the object moves closer. However, due to the decrease of light intensity over distance, the dynamic of the sensor is not impaired. The distances for which the output of the ToF sensor is maximum may be adjusted independently for the CW and CM measurements. Accordingly, the maximum ToF sensor output for the CW and CM measurements is at different distances of an object in the scene to the ToF sensor.

The improved exposure times may enable to determine the distance (depth) and further quantities such as a signal strength (e.g., for an intensity image) with improved resolution. In particular, the resolution is gained because longer exposure times are possible for certain distance ranges.

Another interesting quantity in ToF sensing is the intensity of light I received during a ToF measurement. The intensity of light I represents how much light arrives back at a pixel. The intensity of light/may, e.g., be used for generating a greyscale image used in various applications such as face recognition. For example, the intensity of light/may be represented as a scalar value without a unit, which is mapped to a certain range.

According to the proposed technique, the intensity of light low received during the at least one continuous CW is determined based on the at least one first measurement value $C_{CW}$. Similarly, the intensity of light $I_{CM}$ received during the at least one CM measurement based on the at least one second measurement value $C_{CM}$. Based on the determined intensity of light $I_{CW}$ received during the at least one CW measurement and the determined intensity of light $I_{CM}$ received during the at least one CM measurement, a greyscale value for a greyscale image may be determined.

For example, if exactly one CW measurement and one CM measurement are performed, the light intensities $I_{CW}$ and $I_{CM}$ may be determined as follows:

$$I_{CW} = \frac{C_{CW}}{c_{CW}(ts)} \quad (7)$$

$$I_{CM} = \frac{C_{CM}}{c_{CM}(ts)}. \quad (8)$$

The correlation functions $c_{CW}(ts)$ and $c_{CM}(ts)$ are known (e.g., from calibration). The argument ts may be calculated based on the speed of light c and the estimate $\tilde{d}$ of the distance value. For example, ts=c·$\tilde{d}$.

The final light intensity I may, e.g., be the average of the light intensities $I_{CW}$ and $I_{CM}$. If the CW and the CM measurements were obtained with different exposure times, the light intensities $I_{CW}$ and $I_{CM}$ may be normalized to compensate for the different exposure times. The normalization may, e.g., be done by multiplying a normalization value. The final light intensity I may be used as greyscale value for a greyscale image, or greyscale value for a greyscale image may be derived from the light intensity I.

If two CW measurement and two CM measurement are performed, the light intensities $I_{CW}$ and $I_{CM}$ may be determined analogously taking into account both measurement values for the respective type of measurement:

$$I_{CW} = \frac{C_{CW1} - C_{CW2}}{c_{CW1}(ts) - c_{CW1}(ts)} \quad (9)$$

$$I_{CM} = \frac{C_{CM1} - C_{CM2}}{c_{CM1}(ts) - c_{CM1}(ts)}. \quad (10)$$

Analogously to the distance (depth) calculation, the corresponding measurement values are subtracted from each other for individually calculating the light intensities for the CW and the CM measurements. The correlation functions $c_{CW1/2}(ts)$ and $c_{CM1/2}(ts)$ are known (e.g., from calibration). The argument ts may be calculated based on the speed of light c and the estimate $\tilde{d}$ of the distance value. For example, ts=c·$\tilde{d}$. The final light intensity/may again be the average of the light intensities $I_{CW}$ and $I_{CM}$. Further, different exposure times may be compensated by normalization.

As can be seen from mathematical expressions (7) to (10), the intensity of light $I_{CW}$ received during the at least one CW measurement and the intensity of light $I_{CM}$ received during the at least one CM measurement may be further determined based on the estimate d̂ of the distance value.

The proposed technology may enable synergetic CW and CM ToF sensing.

Figure 7:
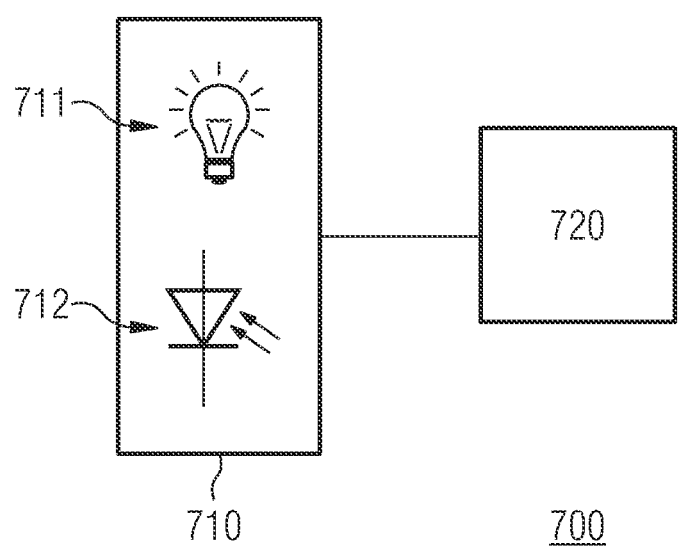
FIG. 7 illustrates an example of an apparatus for ToF sensing.

An example of an apparatus 700 for ToF sensing of a scene according to the proposed technique is further illustrated in FIG. 7. The apparatus 700 comprises a ToF sensor 710. The ToF sensor 710 comprises an illumination element 711 and a light capturing element 712 for performing ToF measurements according to the above-described techniques for ToF sensing. In particular, the ToF sensor 710 is configured to perform at least one CW measurement to obtain at least one first measurement value for at least one pixel position, and to perform at least one CM measurement to obtain at least one second measurement value for the pixel position. For example, the illumination element 711 may comprise one or more Light-Emitting Diodes, LEDs, or one or more laser diodes for illuminating the scene. The light capturing element 712 may, e.g., comprise optics, an image sensor with a plurality of pixels, and driver electronics for measuring reflected light from the scene. For example, each pixel may comprise a PMD for measuring the reflected light.

Further, the apparatus 700 comprises a processing circuit 720. For example, the processing circuit 720 may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuit 720 may optionally be coupled to, e.g., read only memory (ROM) for storing software, random access memory (RAM) and/or non-volatile memory. The processing circuit 720 is configured to perform processing according to the above-described techniques for ToF sensing. In particular, the processing circuit 720 is configured to determine an estimate of a distance value of the pixel position based on the at least one first measurement value and the at least one second measurement value using a mapping function.

The apparatus 700 may further comprise further hardware-conventional and/or custom.

The examples as described herein may be summarized as follows:

Some examples relate to a method for ToF sensing. The method comprises for at least one pixel position performing at least one CW measurement to obtain at least one first measurement value for the pixel position. Further, the method comprises performing at least one CM measurement to obtain at least one second measurement value for the pixel position. The method additionally comprises determining an estimate of a distance value of the pixel position based on the at least one first measurement value and the at least one second measurement value using a mapping function.

In some examples, the method further comprises determining whether the distance value is likely to be in a target distance range, wherein the estimate of the distance value is only determined if it is determined that the distance value is likely to be in the target distance range.

According to some examples, determining whether the distance value is likely to be in the target distance range comprises: comparing a second value related to the at least one second measurement value to a threshold value defined for the target distance range; and determining that the distance value for the pixel position is likely to be in the target distance range if the second value satisfies a predetermined condition with respect to the threshold value.

In some examples, the method further comprises scaling at least one of the threshold value and the second value based on a scaling value prior to comparing it to the other one of the threshold value and the second value.

According to alternative examples, determining whether the distance value is likely to be in the target distance range comprises: determining whether a first value related to the at least one first measurement value is within a first value range defined for a beginning of the target distance range or within a second value range defined for an end of the target distance range;
if the first value is within the first value range: comparing the second value to a first threshold value defined for the target distance range; and determining that the distance value for the pixel position is likely to be in the target distance range if the second value satisfies a predetermined condition with respect to the first threshold value; and if the ratio value is within the second value range: comparing the second value to a second threshold value defined for the target distance range; and determining that the distance value for the pixel position is likely to be in the target distance range if the second value satisfies a predetermined condition with respect to the second threshold value.

In some examples, the method further comprises scaling at least one of the second value and the one of the first threshold value and the second threshold value based on a scaling value prior to comparing it to the other one of the second value and the one of the first threshold value and the second threshold value.

According to some examples, the method further comprises determining the scaling value based on an estimate of an intensity of light received during the at least one CW measurement or the at least one CM measurement.

In some examples, the estimate of the intensity of light is a greyscale value in a greyscale image captured in addition to the at least one CW measurement and the at least one CM measurement or a total amount of charges obtained by a light-capturing element at the pixel position for the at least one CW measurement or the at least one CM measurement.

According to further alternative examples, determining whether the distance value is likely to be in the target distance range comprises: comparing a second value related to the at least one second measurement value to a first threshold value defined for the target distance range; and if the second value satisfies a predetermined condition with respect to the first threshold value:
scaling a first value related to the at least one first measurement value based on a scaling value to obtain a scaled first value; comparing the scaled first value to the second value; if the scaled first value satisfies a predetermined condition with respect to the second value, comparing the first value to a second threshold value defined for the target distance range; and determining that the distance value for the pixel position is likely to be in the target distance range if the first value satisfies a predetermined condition with respect to the second threshold value.

In some examples, the scaling value is the ratio of a value of a correlation function of the at least one CM measurement for a target distance to a value of a correlation function of the at least one CW measurement for the target distance, and wherein the target distance limits the target distance range.

According to some examples, the method further comprises determining a ratio value based on a ratio of a first value related to the at least one first measurement value to a second value related to the at least one second measurement value, and wherein determining the estimate of the distance value of the pixel position comprises determining the estimate of the distance value based on the ratio value using the mapping function.

In some examples, one CW measurement is performed to obtain one first measurement value for the pixel position, and wherein one CM measurement is performed to obtain second measurement value for the pixel position.

Accordingly, the first value is the one obtained first measurement value, and wherein the second value is the one obtained second measurement value.

In alternative examples, two CW measurements are performed to obtain two first measurement values for the pixel position, and wherein two CM measurements are performed to obtain two second measurement values for the pixel position.

Accordingly, the first value corresponds to a difference between the two first measurement values, and wherein the second value corresponds to a difference between the two second measurement values.

According to some examples, correlation functions of the two CW measurements are phase-shifted by 180° with respect to each other, and wherein correlation functions of the two CM measurements are phase-shifted by 180° with respect to each other.

In some examples, the ratio value is further determined based on a ratio of an exposure time used for the at least one CM measurement to an exposure time used for the at least one CW measurement.

According to some examples, the method further comprises: determining an intensity of light received during the at least one CW measurement based on the at least one first measurement value for the pixel position; determining an intensity of light received during the at least one CM measurement based on the at least one second measurement value for the pixel position; and determining a greyscale value for a greyscale image based on the determined intensity of light received during the at least one CW measurement and the determined intensity of light received during the at least one CM measurement.

In some examples, at least one of the intensity of light received during the at least one CW measurement and the intensity of light received during the at least one CM measurement is further determined based on the estimate of the distance value.

According to some examples, a respective absolute value of correlation functions of the at least one CW measurement and the at least one CM measurement is smaller than a threshold value for a predetermined distance.

In some examples, an element covering a time-of-flight sensor used for the at least one CW measurement and the at least one CM measurement is arranged at the predetermined distance with respect to the time-of-flight sensor.

According to some examples, an exposure time used for the at least one CM measurement is longer than an exposure time used for the at least one CW measurement.

In some examples, the method further comprises determining the mapping function based on CW calibration measurements, wherein a reference object is arranged at a reference distance in the scene during the CW calibration measurements, and wherein different time lags between a CW illumination signal used for illuminating the scene and a reference signal used for capturing reflected light from the scene are used for the CW calibration measurements.

According to some examples, a ratio of correlation functions of the at least one CW measurement and the at least one CM measurement is strictly monotonic decreasing or strictly monotonic increasing in the target distance range.

In some examples, the method further comprises determining the distance value by applying at least one error correction to the estimate of the distance value.

According to some examples, if it is determined that the distance value for the pixel position is likely to be outside of the target distance range, the method comprises outputting an information indicating that an object in the scene at a position corresponding to the pixel position exhibits a distance not within the target distance range.

Other examples relate to an apparatus for ToF sensing of a scene. The apparatus comprises a ToF sensor comprising a plurality of pixels. The ToF sensor is for at least one pixel position configured to perform at least one CW measurement to obtain at least one first measurement value for the pixel position, and to perform at least one CM measurement to obtain at least one second measurement value for the pixel position. Additionally, the apparatus comprises a processing circuit configured to determine an estimate of a distance value of the pixel position based on the at least one first measurement value and the at least one second measurement value using a mapping function.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in non-transitory machine-readable medium and so executed by a computer, processor or programmable hardware component, whether or not such computer, processor or programmable hardware component is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for time-of-flight sensing of a scene, the method comprising for at least one pixel position:
performing at least one continuous wave measurement to obtain at least one first measurement value for the pixel position;
performing at least one coded modulation measurement to obtain at least one second measurement value for the pixel position; and
determining an estimate of a distance value of the pixel position based on the at least one first measurement value and the at least one second measurement value, using a mapping function that maps an argument value derived from both a first value obtained from the first measurement value and a second value obtained from the second measurement value to an estimated distance value.

2. The method of claim 1, further comprising:
determining whether the distance value is likely to be in a target distance range, wherein the estimate of the distance value is only determined if it is determined that the distance value is likely to be in the target distance range.

3. The method of claim 2, wherein determining whether the distance value is likely to be in the target distance range comprises:
comparing a second value related to the at least one second measurement value to a threshold value defined for the target distance range; and
determining that the distance value for the pixel position is likely to be in the target distance range responsive to determining that the second value satisfies a predetermined condition with respect to the threshold value.

4. The method of claim 2, wherein determining whether the distance value is likely to be in the target distance range comprises:
determining whether a first value related to the at least one first measurement value is within a first value range defined for a beginning of the target distance range or within a second value range defined for an end of the target distance range;
responsive to determining that the first value is within the first value range:
comparing a second value related to the at least one second measurement value to a first threshold value defined for the target distance range; and
determining that the distance value for the pixel position is likely to be in the target distance range if the second value satisfies a predetermined condition with respect to the first threshold value; and
responsive to determining that the first value is within the second value range:
comparing the second value to a second threshold value defined for the target distance range; and
determining that the distance value for the pixel position is likely to be in the target distance range if the second value satisfies a predetermined condition with respect to the second threshold value.

5. The method of claim 2, wherein determining whether the distance value is likely to be in the target distance range comprises:
comparing a second value related to the at least one second measurement value to a first threshold value defined for the target distance range; and
responsive to determining that the second value satisfies a predetermined condition with respect to the first threshold value:
scaling a first value related to the at least one first measurement value based on a scaling value to obtain a scaled first value;
comparing the scaled first value to the second value; and
responsive to determining that the scaled first value satisfies a predetermined condition with respect to the second value, comparing the first value to a second threshold value defined for the target distance range; and
determining that the distance value for the pixel position is likely to be in the target distance range, responsive to determining that the first value satisfies a predetermined condition with respect to the second threshold value.

6. The method of claim 1, wherein the method further comprises determining a ratio value based on a ratio of a first value related to the at least one first measurement value to a second value related to the at least one second measurement value, and wherein determining the estimate of the distance value of the pixel position comprises determining the estimate of the distance value based on the ratio value using the mapping function.

7. The method of claim 1, wherein one continuous wave measurement is performed to obtain one first measurement value for the pixel position, and wherein one coded modulation measurement is performed to obtain second measurement value for the pixel position.

8. The method of claim 1, wherein two continuous wave measurements are performed to obtain two first measurement values for the pixel position, and wherein two coded modulation measurements are performed to obtain two second measurement values for the pixel position.

9. The method of claim 8, wherein the method further comprises determining a ratio value based on a ratio of a first value related to the at least one first measurement value to a second value related to the at least one second measurement value, and wherein determining the estimate of the distance value of the pixel position comprises determining the estimate of the distance value based on the ratio value using the mapping function, and wherein the first value corresponds to a difference between the two first measurement values and the second value corresponds to a difference between the two second measurement values.

10. The method of claim 1, further comprising:
determining an intensity of light received during the at least one continuous wave measurement based on the at least one first measurement value for the pixel position;
determining an intensity of light received during the at least one coded modulation measurement based on the at least one second measurement value for the pixel position; and
determining a greyscale value for a greyscale image based on the determined intensity of light received during the at least one continuous wave measurement and the determined intensity of light received during the at least one coded modulation measurement.

11. The method of claim 10, wherein at least one of the intensity of light received during the at least one continuous wave measurement and the intensity of light received during the at least one coded modulation measurement is further determined based on the estimate of the distance value.

12. The method of claim 1, wherein a respective absolute value of correlation functions of the at least one continuous wave measurement and the at least one coded modulation measurement is smaller than a threshold value for a predetermined distance.

13. The method of claim 1, wherein a ratio of correlation functions of the at least one continuous wave measurement and the at least one coded modulation measurement is strictly monotonic decreasing or strictly monotonic increasing in the target distance range.

14. The method of claim 1, wherein, if it is determined that the distance value for the pixel position is likely to be outside of the target distance range, the method comprises outputting an information indicating that an object in the scene at a position corresponding to the pixel position exhibits a distance not within the target distance range.

15. An apparatus for time-of-flight sensing of a scene, comprising:

a time-of-flight sensor comprising a plurality of pixels, wherein the time-of-flight sensor is for at least one pixel position configured to:
    perform at least one continuous wave measurement to obtain at least one first measurement value for the pixel position; and
    perform at least one coded modulation measurement to obtain at least one second measurement value for the pixel position; and a processing circuit configured to determine an estimate of a distance value of the pixel position based on the at least one first measurement value and the at least one second measurement value using a mapping function that maps an argument value derived from both a first value obtained from the first measurement value and a second value obtained from the second measurement value to an estimated distance value.

* * * * *